(No Model.)
E. D. SCHMITT & H. I. MASON.
PULLEY.
No. 434,610. Patented Aug. 19, 1890.
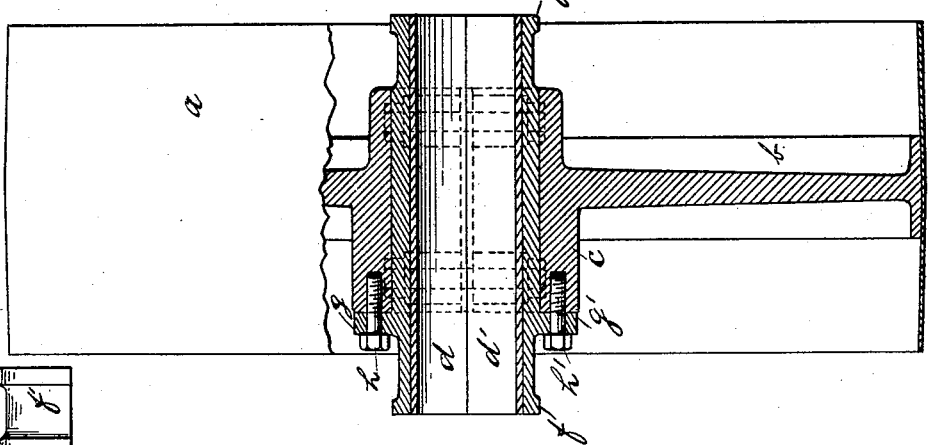
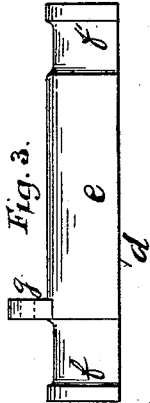
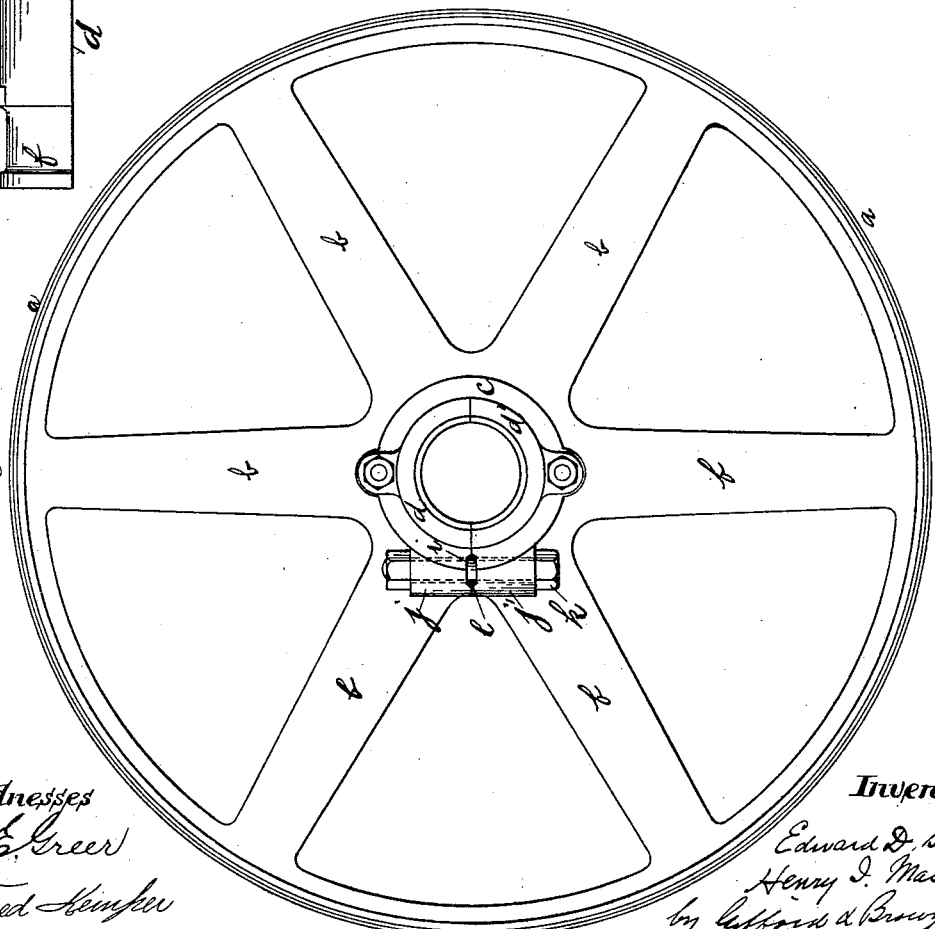
Witnesses
J. E. Greer
Fred Kemper
Inventors
Edward D. Schmitt
Henry I. Mason
by Clifford & Brown
Attys.

UNITED STATES PATENT OFFICE.

EDWARD D. SCHMITT AND HENRY I. MASON, OF CUYAHOGA FALLS, OHIO, ASSIGNORS TO THE FALLS RIVET AND MACHINE COMPANY, OF OHIO.

PULLEY.

SPECIFICATION forming part of Letters Patent No. 434,610, dated August 19, 1890.

Application filed May 14, 1889. Serial No. 310,747. (No model.)

*To all whom it may concern:*

Be it known that we, EDWARD D. SCHMITT and HENRY I. MASON, of Cuyahoga Falls, Ohio, have invented a new and useful Improvement in Pulleys, of which the following is a specification.

Heretofore split bushings have been used in pulleys, driven into a solid hub so as to fit tightly therein, but great difficulty has been experienced in removing them after they became worn.

Our invention consists in providing the pulley with a hub split on one side so as to admit of its being sprung apart to release the bushing, and combining with a hub so split a bushing divided into two parts.

In the drawings, Figure 1 is an end view of the pulley. Fig. 2 is a longitudinal section of the same through the center of the hub. Fig. 3 is one-half of the bushing detached.

$a$ is the rim of the pulley; $b$, the spokes; $c$, the hub. $d$ and $d'$ are the two halves of the bushing. This bushing is made so that when the two halves are placed together the diameter will be such as to correspond with the inside diameter of the hub. Each half of the bushing is made with a body portion $e$ and two end portions $f$ and $f'$. The body portion $e$ is to be included within the hub when in position, and the end portions $f$ and $f'$ are to project from opposite ends of the hub a proper distance to space the pulley from the collar or other contrivance upon the shaft to hold it in longitudinal position.

$g$ and $g'$ are lugs projecting from one end of the body $c$ to each half of the bushing so as to overlap the end of the hub, as shown in Fig. 2. These lugs and the hub are drilled so as to receive the bolts $h$ and $h'$.

Now, it will be seen that the two halves of the bushing being placed together they may be inserted endwise into the hub from the left-hand end of the pulley, Fig. 2, until the lugs $g$ and $g'$ come against the end of the hub, in which place it is firmly secured by tightening the bolts $h$ and $h'$. Besides affording great facility for attachment, this construction enables the longitudinal position of the bushing in the hub to be accurately fixed by planing the surfaces of the hub and lugs which come in contact, thus insuring the exact extent of projection of the end pieces $f$ and $f'$ which is required at each end of the pulley. This is of great utility where, in extensive manufacturing for the general market, it is desired to make all the parts to a gage and in duplicate, so that bushings can be kept in stock, suitable to be applied without alteration to pulleys already constructed and in use.

To facilitate the insertion and removal of the bushing, the hub is split on one side, as at $i$, Fig. 1, and on each side of the split is provided with lugs $j$ and $j'$, which are drilled so as to receive the bolt $k$. Between these two lugs a slot $l$ is cut so as to admit of the insertion of a wedge. Now, the bolt $k$ having been removed, the forcing of a wedge into the slot $l$ will spring apart the hub at the split $i$, so as to admit of the ready insertion or removal of the bushing. Then by removing the wedge and inserting and screwing up the bolt $k$ the bushing will be firmly grasped by the hub and the pulley will be made practically as secure as though of one piece. Lugs $j$ and $j'$ and a bolt $k$ are arranged on each side of the spokes $b$, as shown in dotted lines, Fig. 2. This contrivance also facilitates the manufacture of parts in duplicate to a gage, because it reduces the accuracy with which it is necessary to fit the bushings within the hub. By the use of it, also, the corrosion of the surface of the hub and bushing in contact will not interfere with the removal of the bushing.

What is claimed is—

1. In combination, a pulley having its hub of a single piece split on one side only, and a bushing divided into two parts, by virtue of which combination the hub may be sprung apart to permit the bushing to be slid longitudinally therefrom and the bushing may be thereupon removed laterally from the shaft, substantially as described.

2. In combination, a pulley having a hub split on one side, and a bushing divided into two parts, each part containing a laterally-projecting lug adapted to overlap and be secured to the end of the hub, substantially as described.

EDWARD D. SCHMITT.
HENRY I. MASON.

Witnesses:
J. C. CASTLE,
C. H. MOOR.